No. 828,224. PATENTED AUG. 7, 1906.
H. G. LEISENRING.
TRAP NEST.
APPLICATION FILED APR. 20, 1906.
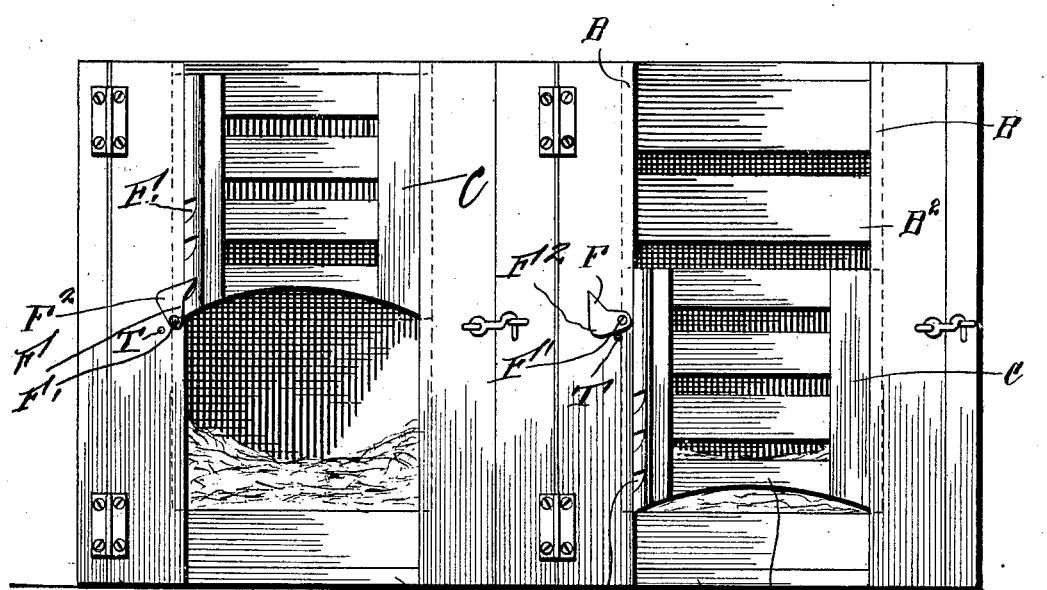
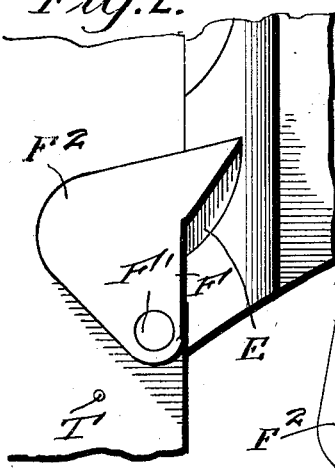
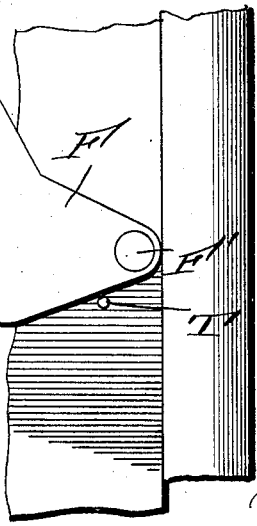
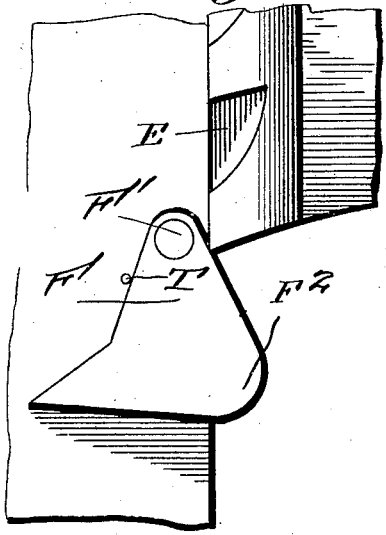
WITNESSES
INVENTOR
H. G. Leisenring,
BY Franklin H. Hough
Attorney
THE NORRIS PETERS CO., WASHINGTON, D. C.

UNITED STATES PATENT OFFICE.

HENRY G. LEISENRING, OF WAYNE, NEBRASKA.

TRAP-NEST.

No. 828,224.     Specification of Letters Patent.     Patented Aug. 7, 1906.

Application filed April 20, 1906. Serial No. 312,877.

*To all whom it may concern:*

Be it known that I, HENRY G. LEISENRING, a citizen of the United States, residing at Wayne, in the county of Wayne and State of Nebraska, have invented certain new and useful Improvements in Trap-Nests; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to new and useful improvements in trap-nests for hens, &c.; and the object in view is to produce a simple and efficient means for allowing a door to automatically close as a hen enters the nest.
The invention consists in various details of construction and combinations and arrangements of parts, which will be hereinafter fully described, and then specifically defined in the appended claims.
I illustrate my invention in the accompanying drawings, in which—

Figure 1 is a front elevation of two nests equipped with my invention, one of said nests showing the trap closed and the other open.
Fig. 2 is an enlarged detail view in side elevation, showing a gravity-block engaging a notch in the trap-door. Fig. 3 is a detail view showing the locking-pawl out of engagement with the trap-door, and Fig. 4 is a similar view showing the pawl at its lowest throw.

Reference now being had to the details of the drawings by letter, A designates the casings in which the nests are formed and provided with grooves B along the opposite edges of the opening of the door B², and C designates a trap-door mounted vertically in said grooves and provided at its lower end with a concaved bottom D. Along one edge of the door is a series of notches E, and F designates a pawl pivoted upon a pin F', adjacent to one of the edges of the opening. Said pawl has a laterally-projecting part F², which throws the center of gravity outside of a vertical line passing through the pivot-pin, whereby when the nest is raised the weighted portion of the pawl will cause the same to fall to the position shown in Figs. 3 and 4 of the drawings, thereby allowing the door to fall to the closed position shown in Fig 1.

T designates a pin which may be inserted in an aperture in the door adjacent to the gravity-catch, whereby the latter may be held so that it will not act automatically for releasing the door, but rather to support the door by the bottom of the latter coming in contact with one edge of the catch, as shown in Fig. 4 of the drawings.

In operation, the door being raised and held partially open, as at the left hand of Fig. 1, and when a hen enters the nest and comes in contact with the concaved portion of the door and exerting sufficient pressure to slightly raise the door the gravity-pawl F will turn down in the position shown in Fig. 3 of the drawings, and after the hen has passed in to the nest the gate will fall to the closed position, as shown at the right hand of Fig. 1 of the drawings.

From the foregoing it will be noted that by the provision of the apparatus shown and described a simple and efficient means is afforded for causing the trap-door to automatically close by a hen's passing through the same, and when it is desired to hold the door in a raised position the pin may be inserted in the aperture in the door and hold the pawl or catch so as to support the door in the manner shown.

What I claim is—

1. A trap-nest comprising a casing, a vertically-sliding trap therein, a weighted pawl pivoted upon the casing and adapted to engage notches in the trap, said pawl adapted to be automatically released from the trap as the latter is raised, as set forth.

2. A trap-nest comprising a casing having doors thereto with grooves along the marginal edges of openings therein, a vertically-movable trap mounted in said grooves and provided with series of notches along one edge, a gravity-pawl pivoted upon the door and having a point adapted to engage said notches, a weighted portion of said pawl being outside a vertical line through its pivot, whereby as the trap is raised, the pawl will disengage said notches, as set forth.

3. A trap-nest comprising a casing having doors thereto with grooves along the marginal edges of openings therein, a vertically-movable trap mounted in said grooves and provided with series of notches along one edge, a gravity-pawl pivoted upon the door and having a point adapted to engage said notches, a weighted portion of said pawl being outside a vertical line through its pivot, whereby as the trap is raised, the pawl will disengage said notches, and a pin carried by the door and adapted to hold said pawl from turning upon its pivot, as set forth.

In testimony whereof I hereunto affix my signature in the presence of two witnesses.

HENRY G. LEISENRING.

Witnesses:
 H. B. JONES,
 C. H. SWEET.